United States Patent
Cowie et al.

(10) Patent No.: US 9,126,753 B2
(45) Date of Patent: Sep. 8, 2015

(54) BOLSTER FOR CONSTRUCTION CONTAINER

(75) Inventors: Charles Henry Cowie, Jonesboro, AR (US); Richard A. Samsel, Haines City, FL (US)

(73) Assignee: Apex Brands, Inc., Sparks, MD (US)

( * ) Notice: Subject to any disclaimer, the term of this patent is extended or adjusted under 35 U.S.C. 154(b) by 0 days.

(21) Appl. No.: 13/166,440

(22) Filed: Jun. 22, 2011

(65) Prior Publication Data

US 2011/0303683 A1     Dec. 15, 2011

Related U.S. Application Data

(63) Continuation of application No. 11/930,563, filed on Oct. 31, 2007, now abandoned.

(60) Provisional application No. 60/857,879, filed on Nov. 9, 2006.

(51) Int. Cl.
    B65D 90/12      (2006.01)
    B65D 90/16      (2006.01)
    (Continued)

(52) U.S. Cl.
    CPC .............. B65D 90/12 (2013.01); B62B 3/003 (2013.01); B65D 90/16 (2013.01); B65D 90/18 (2013.01); *B62B 2203/20* (2013.01); *B65D 90/146* (2013.01)

(58) Field of Classification Search
    CPC ...... B65D 90/146; B65D 90/16; B65D 90/18; B65D 90/12; B62B 3/003; B62B 2203/20
    USPC .......... 108/56.3, 57.17, 57.22, 51.3; 206/386, 206/595, 596, 599, 600; 248/346.5; 220/1.5, 4.28, 4.33, 6, 7, 628, 636, 220/676, 729, DIG. 25
See application file for complete search history.

(56) References Cited

U.S. PATENT DOCUMENTS 1,359,138 A    11/1920   Wine
1,647,263 A    11/1927   Blount
(Continued)

FOREIGN PATENT DOCUMENTS

GB      2111022      6/1983

OTHER PUBLICATIONS

Final Office Action dated Jul. 9, 2014 for U.S. Appl. No. 13/869,245.
(Continued)

*Primary Examiner* — Stephen Castellano
(74) *Attorney, Agent, or Firm* — Nelson Mullins Riley & Scarborough, LLP (57) ABSTRACT

A container adapted to be lifted by a forklift having a pair of prongs, including a receptacle having a floor, a front wall, a rear wall, and a pair of opposed sidewalls, wherein a front edge, a rear edge and side edges of the floor define a perimeter of the floor. A plurality of bolsters is attached to the floor such that each bolster is within the perimeter, each bolster including a lower panel and a pair of sidewalls extending upwardly to the floor and forming a first entry window configured to slidably receive one of the prongs of the forklift. Each bolster is positioned such that its first entry window is accessible from one of the opposed side edges of the floor, and the prongs of the forklift are slidably receivable between a pair of the bolsters from one of the front edge and the rear edge of the floor.

13 Claims, 10 Drawing Sheets

(51) Int. Cl.
*B65D 90/18* (2006.01)
*B62B 3/00* (2006.01)
*B65D 90/14* (2006.01)

(56) References Cited

U.S. PATENT DOCUMENTS

| | | | |
|---|---|---|---|
| 2,544,743 A | 3/1951 | Vrabcak | |
| 2,639,112 A | 5/1953 | Cushman | |
| 2,928,638 A | 3/1960 | Parker | |
| 3,187,690 A | 6/1965 | Desbois | |
| 3,623,631 A * | 11/1971 | Ford | 220/628 |
| 3,812,995 A | 5/1974 | Lewis | |
| 4,226,192 A | 10/1980 | Myers | |
| 4,509,433 A * | 4/1985 | Farr | 108/52.1 |
| 4,714,169 A | 12/1987 | Keenan et al. | |
| 4,887,731 A * | 12/1989 | Pett et al. | 220/1.5 |
| 5,211,117 A | 5/1993 | Beamer | |
| 5,295,445 A | 3/1994 | Locke et al. | |
| 5,383,409 A | 1/1995 | Hayakawa | |
| 5,425,521 A | 6/1995 | Locke | |
| 5,490,465 A * | 2/1996 | Hoyt et al. | 108/51.3 |
| 6,223,903 B1 | 5/2001 | Mansouri | |
| 6,464,095 B2 * | 10/2002 | Samsel | 220/4.22 |
| 6,837,377 B2 | 1/2005 | Shuert | |
| 6,973,882 B2 | 12/2005 | Baechle et al. | |
| 6,976,435 B2 | 12/2005 | Lucas et al. | |
| 7,025,208 B2 | 4/2006 | Baker et al. | |
| D573,450 S | 7/2008 | Cowie et al. | |
| 7,469,800 B2 | 12/2008 | Elstone et al. | |
| 7,607,628 B2 | 10/2009 | Elder et al. | |
| 2001/0027826 A1 | 10/2001 | Carpenter | |
| 2003/0123965 A1 | 7/2003 | Brackmann et al. | |
| 2004/0025756 A1 | 2/2004 | Baker et al. | |
| 2006/0076255 A1 | 4/2006 | Bragadeste et al. | |
| 2006/0144734 A1 | 7/2006 | Baker et al. | |
| 2006/0175218 A1 | 8/2006 | McTavish et al. | |
| 2006/0226143 A1 | 10/2006 | Elstone et al. | |
| 2007/0209378 A1 | 9/2007 | Larson | |
| 2010/0180614 A1 | 7/2010 | Larson et al. | |

OTHER PUBLICATIONS

Amendment to Final Office Action dated Jul. 9, 2014 for U.S. Appl. No. 13/869,245.

Office Action dated Feb. 27, 2015 for U.S. Appl. No. 13/869,245.

* cited by examiner

BOLSTER FOR CONSTRUCTION CONTAINER

RELATED APPLICATIONS

This application is a continuation of U.S. patent application Ser. No. 11/930,563 filed Oct. 31, 2007, now abandoned, which claims priority to U.S. Provisional Application Ser. No. 60/857,879, filed Nov. 9, 2006, the disclosures of which are incorporated herein by reference in their entirety.

FIELD OF THE INVENTION

The present invention relates to containers, and in particular, the bolsters for construction containers.

BACKGROUND OF THE INVENTION

Large storage containers, including boxes and cabinets, used in the construction industry are often formed of steel sheet. The floor, walls and ceiling (or lid) of the container can be formed either from a single sheet of steel that is bent at intersecting edges of these surfaces or from multiple pieces of sheet steel that are welded together. Many containers have bolsters underlying the floor, and some will include casters beneath the bolsters. Typical sizes for such a cabinet or box can range from 5 $ft^3$ to 150 $ft^3$ or even larger. Exemplary storage containers include those sold under the name JOBOX™ by Delta Consolidated Industries, Jonesboro, Ark. and those sold under the name JOBMASTER™ by Knaack Manufacturing, Crystal Lake, Ill. Large storage containers may be heavy and difficult to move, especially when fully loaded with construction materials. A forklift may be employed to move large storage containers; however, the bolsters and/or casters may make it 25 difficult to orient the forklift prongs under the container to achieve proper balance and a secure lift. The forklift prongs and/or the location of the container may limit the container to be lifted from only one or two sides. Operators may be required to reorient the container so that the desired container side is facing the forklift. This may be difficult and/or time-consuming, especially if space for moving and reorienting the container is limited.

SUMMARY OF THE INVENTION

One embodiment of the present disclosure provides a container adapted to be lifted by a forklift with a pair of prongs, including a receptacle having a floor, a front wall extending upwardly from a front edge of the floor, a rear wall extending upwardly from a rear edge of the floor, and a pair of opposed sidewalls extending upwardly from a pair of side edges of the floor, wherein the front edge, rear edge and side edges of the floor define a perimeter of the floor. A plurality of bolsters is attached to an underside surface of the floor such that each bolster is within the perimeter of the floor, each bolster including a lower panel spaced apart from the underside surface of the floor and a pair of sidewalls extending from the lower panel to the floor such that a first entry window is formed, the first entry window being configured to slidably receive one of the prongs of the forklift. Each bolster is disposed on the underside surface of the floor such that its first entry window is accessible from one of the opposed side edges of the floor, and the prongs of the forklift are slidably receivable between a pair of the plurality of bolsters from one of the front edge and the rear edge of the floor.

Another embodiment of the present disclosure provides a container adapted to be lifted by a forklift with a pair of prongs, including a receptacle having a floor, a front wall extending upwardly from a front edge of the floor, a rear wall extending upwardly from a rear edge of the floor, and a pair of opposed sidewalls extending upwardly from a pair of side edges of the floor, wherein the front edge, rear edge and side edges of the floor define a perimeter of the floor, and the front and rear edges of the floor are longer than the opposed side edges. A first bolster, a second bolster, a third bolster and a fourth bolster are attached to a respective corner of an underside surface of the floor such that each bolster is within the perimeter of the floor, each bolster including a lower panel spaced apart from the underside surface of the floor, and a pair of sidewalls extending from the lower panel to the floor such that a first entry window is formed, the first entry window being configured to slidably receive one of the prongs of the forklift. Each bolster is disposed on the underside surface of the floor such that its first entry window is accessible from one of the opposed side edges of the floor, and the prongs of the forklift are slidably receivable between a first pair of the bolsters from one of the front edge of the floor and a second pair of the bolsters from the rear edge of the floor.

BRIEF DESCRIPTION OF THE DRAWINGS

The accompanying drawings, which are incorporated in and constitute a part of the specification, illustrate embodiments of the invention and, together with the description, serve to explain principles of the invention.

DETAILED DESCRIPTION OF THE INVENTION

The present invention now will be described hereinafter with reference to the accompanying drawings and examples, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting'" etc., another element, it can be directly on, attached to, connected to, coupled with or contacting the other element or intervening elements may also be present. In contrast, when an element is referred to as being, for example, "directly on", directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as 'under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a "first" element, component, region, layer or section discussed below could also be termed a "second" element, component, region, layer or section without departing from the teachings of the present invention. The sequence of operations (or steps) is not limited to the order presented in the claims or figures unless specifically indicated otherwise.

Figure 1:
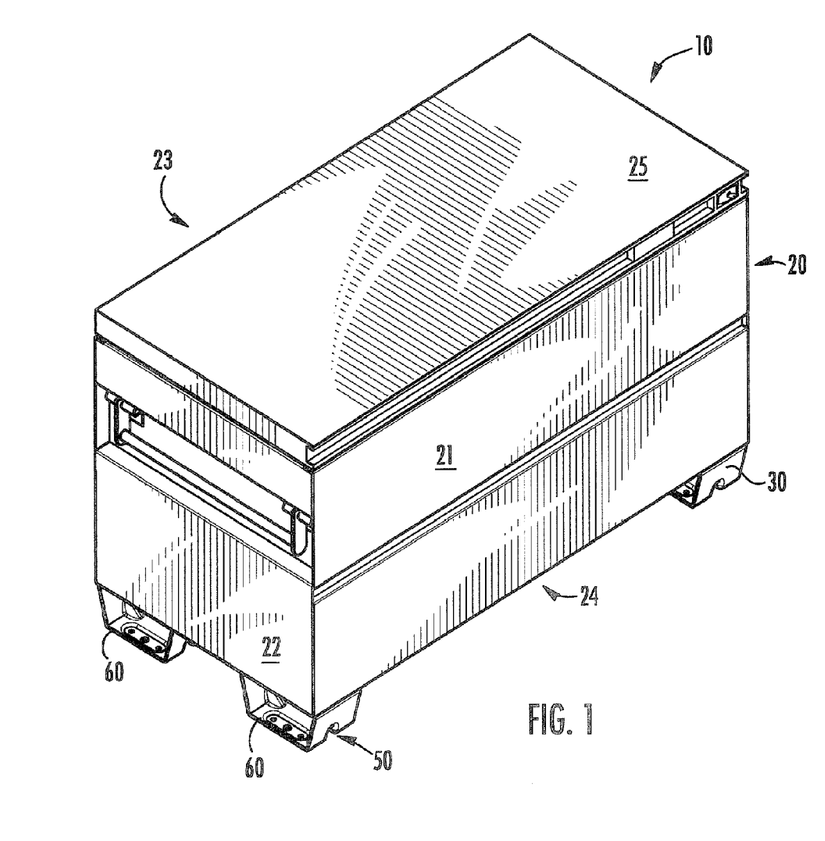
FIG. 1 is a top perspective view of a container having bolsters according to embodiments of the present invention.
Figure 2:
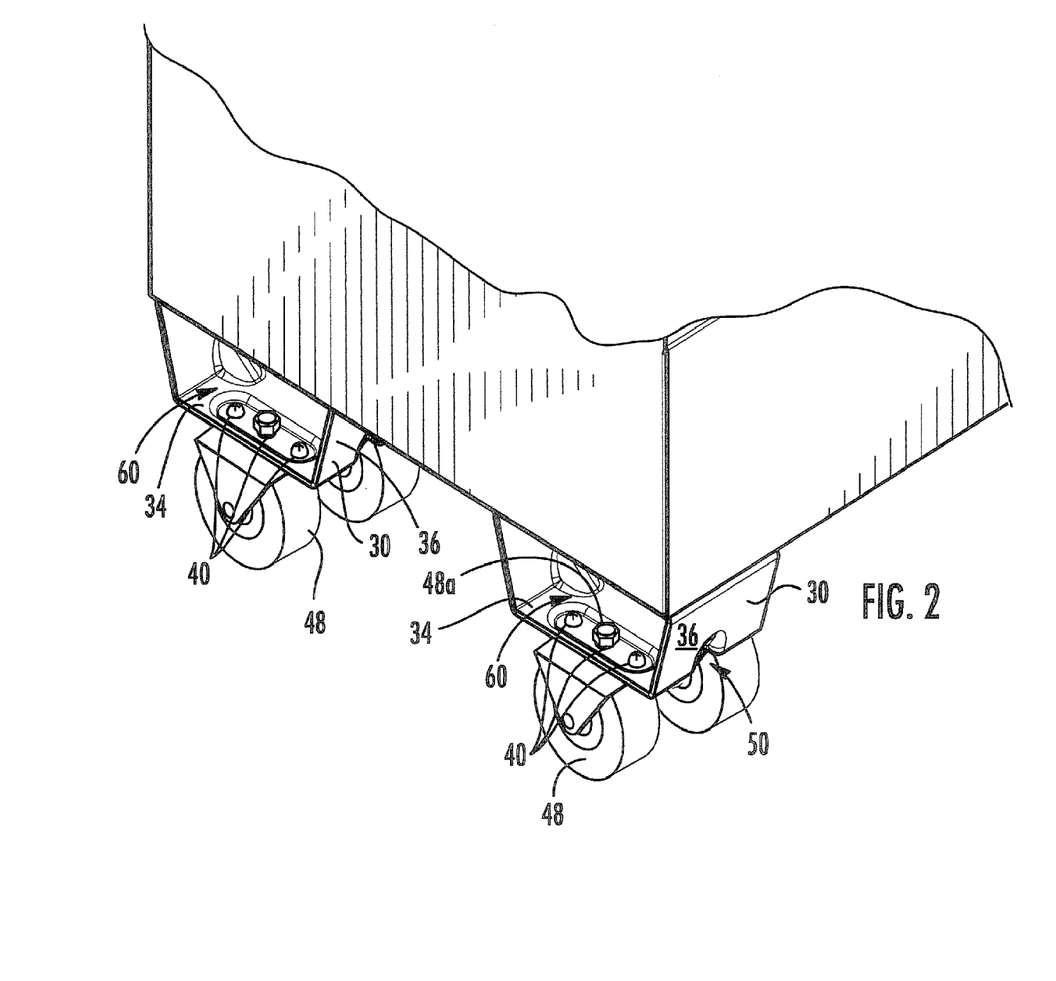
FIG. 2 is an enlarged partial top perspective view of the container and bolster of FIG. 1.
Figure 3:
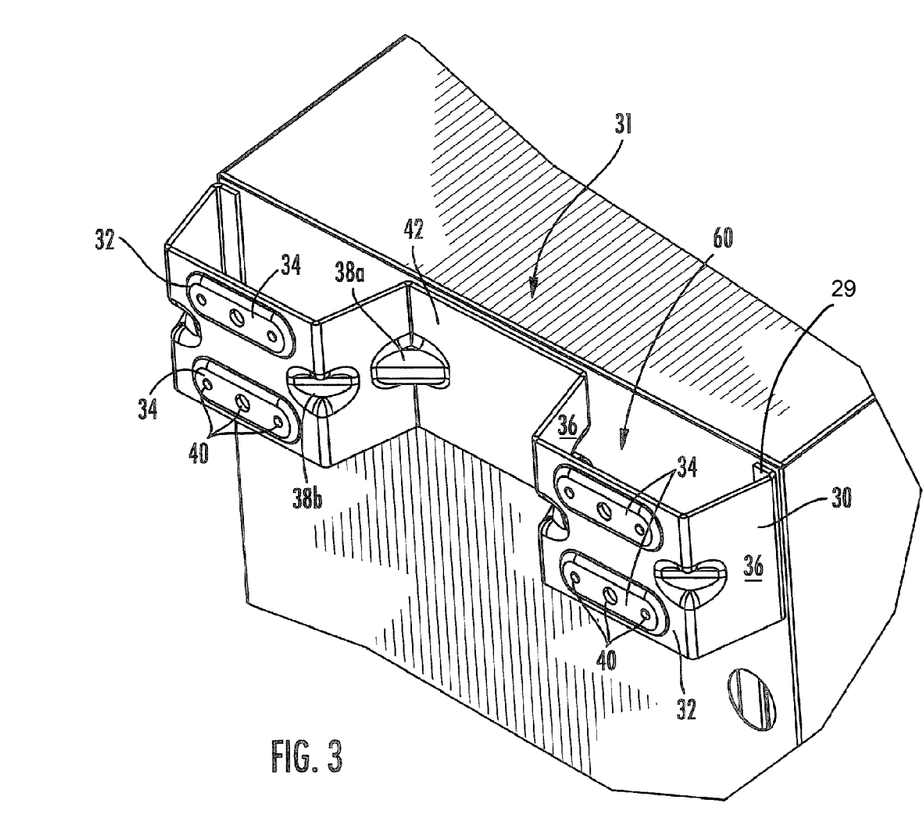
FIG. 3 is an enlarged bottom perspective view of the container and bolsters of FIG. 1 with the casters removed.
Figure 4:
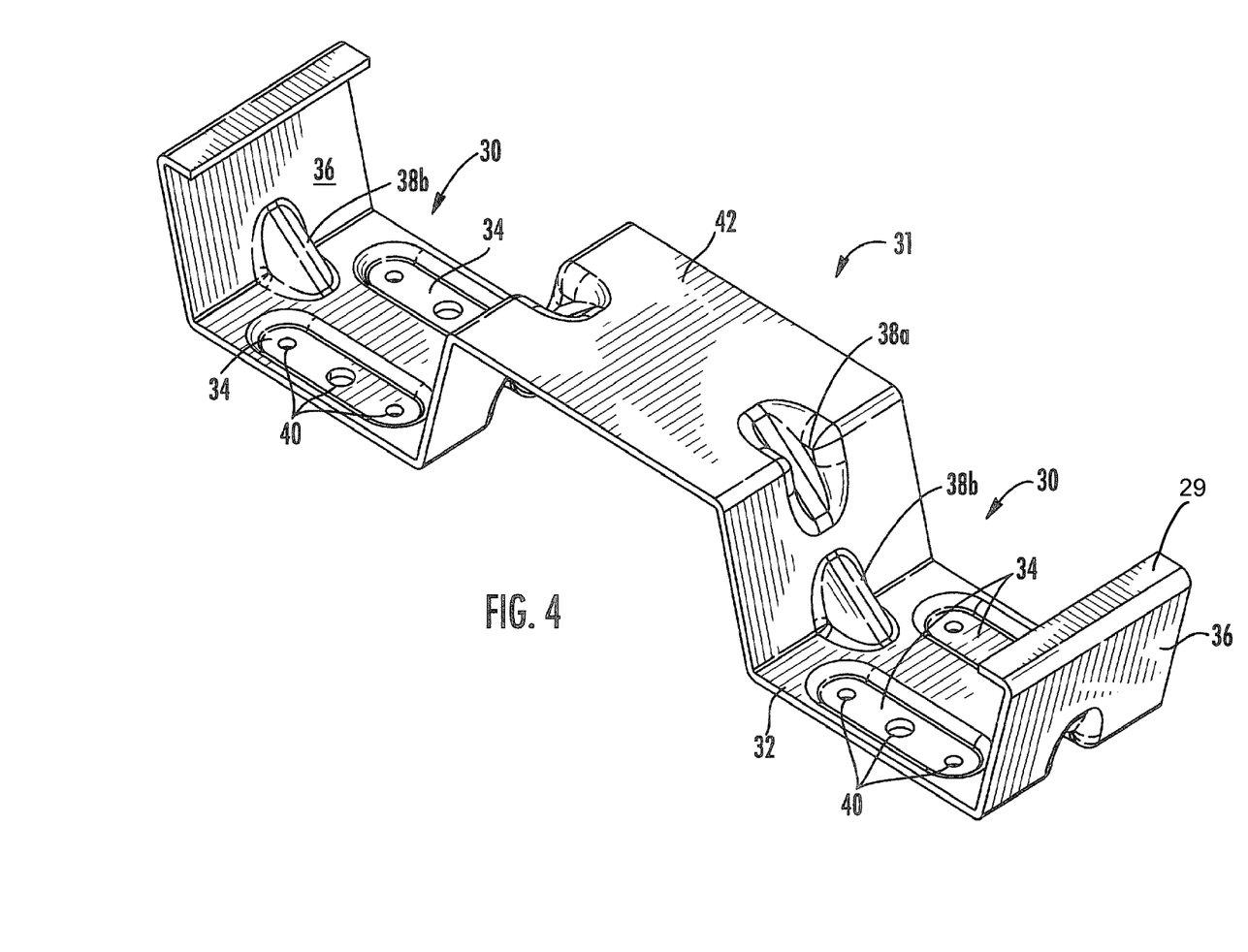
FIG. 4 is a perspective view of the bolster of FIGS. 1-3.
Figure 5:
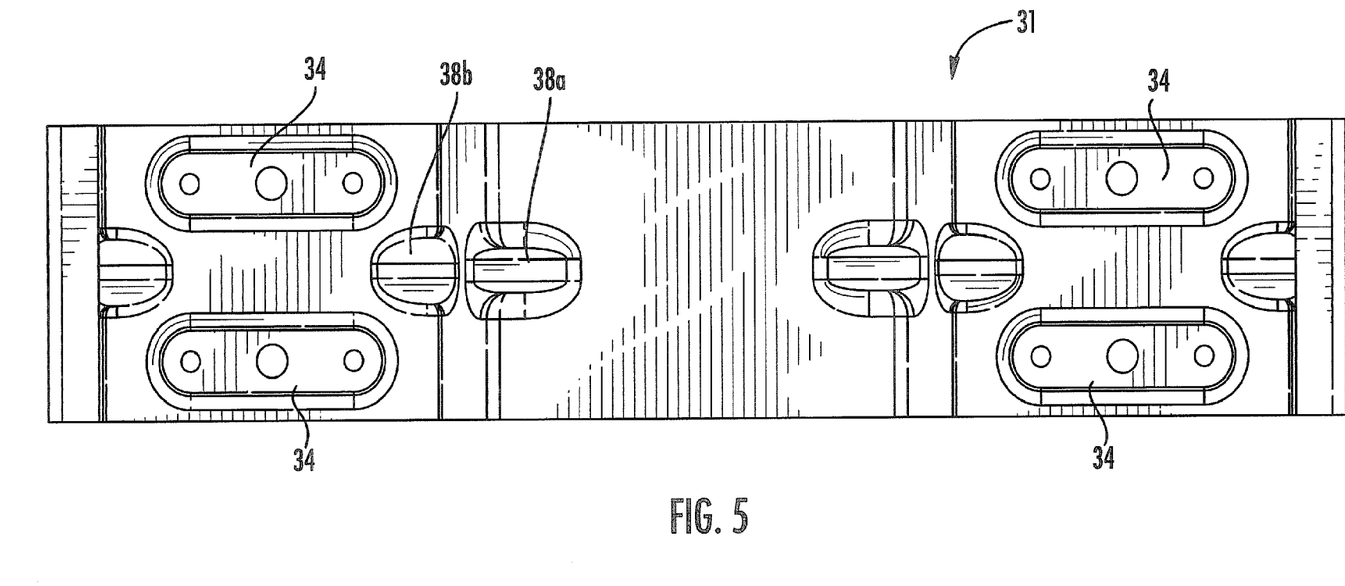
FIG. 5 is a bottom plan view of the bolster of FIGS. 1-4.

Referring to FIGS. 1-3, a container 10 is shown therein. The container 10 includes a receptacle 20 having a front wall 21, opposing sidewalls 22 that are perpendicular to the front wall 21, a rear wall 23 that opposes the front wall 21, and a floor 24. A cover 25 is attached via a hinge to the rear wall 23. The container 10 also includes four bolsters 30 on the underside of the floor 24. The bolsters 30 each define at least two entry windows 50, 60. As shown in FIG. 3-5, two bolsters 30 may be formed as a single, unitary dual bolster assembly 31.

As shown in FIGS. 1-7, each of the bolsters 30 includes an upper peripheral panel 29 and a lower panel 32 with projections 34 that extend downwardly from the lower panel 32 to form the entry window 50. A pair of walls 36 extend upwardly from the lower panel 32 to the floor 24 and form the other entry window 60. In addition, the lower panel 32 includes creases 38a, 38b. The projections 34 include apertures 40. The apertures 40 are configured to receive casters 48 therein as shown in FIG. 2. As shown in FIGS. 3 and 4, an upper center panel 42 connects one or more of the bolsters 30. As shown, for instance in FIG. 6, one of a bolster's walls 36 forms an acute angle with its upper panel 29.

Figure 8:
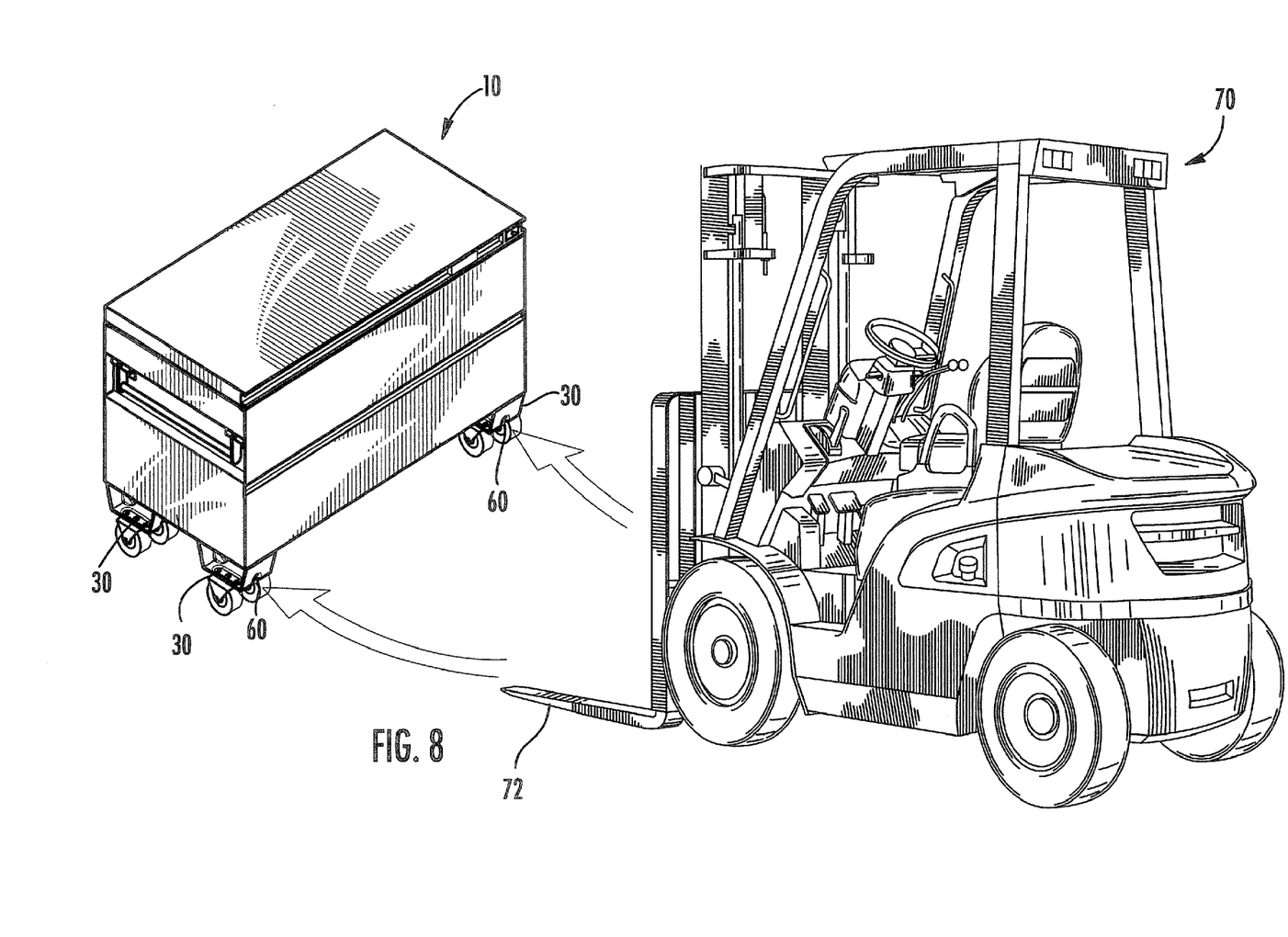
FIG. 8 is a perspective view of the container of FIGS. 1-3 being lifted by a forklift from the front of the container.
Figure 9:
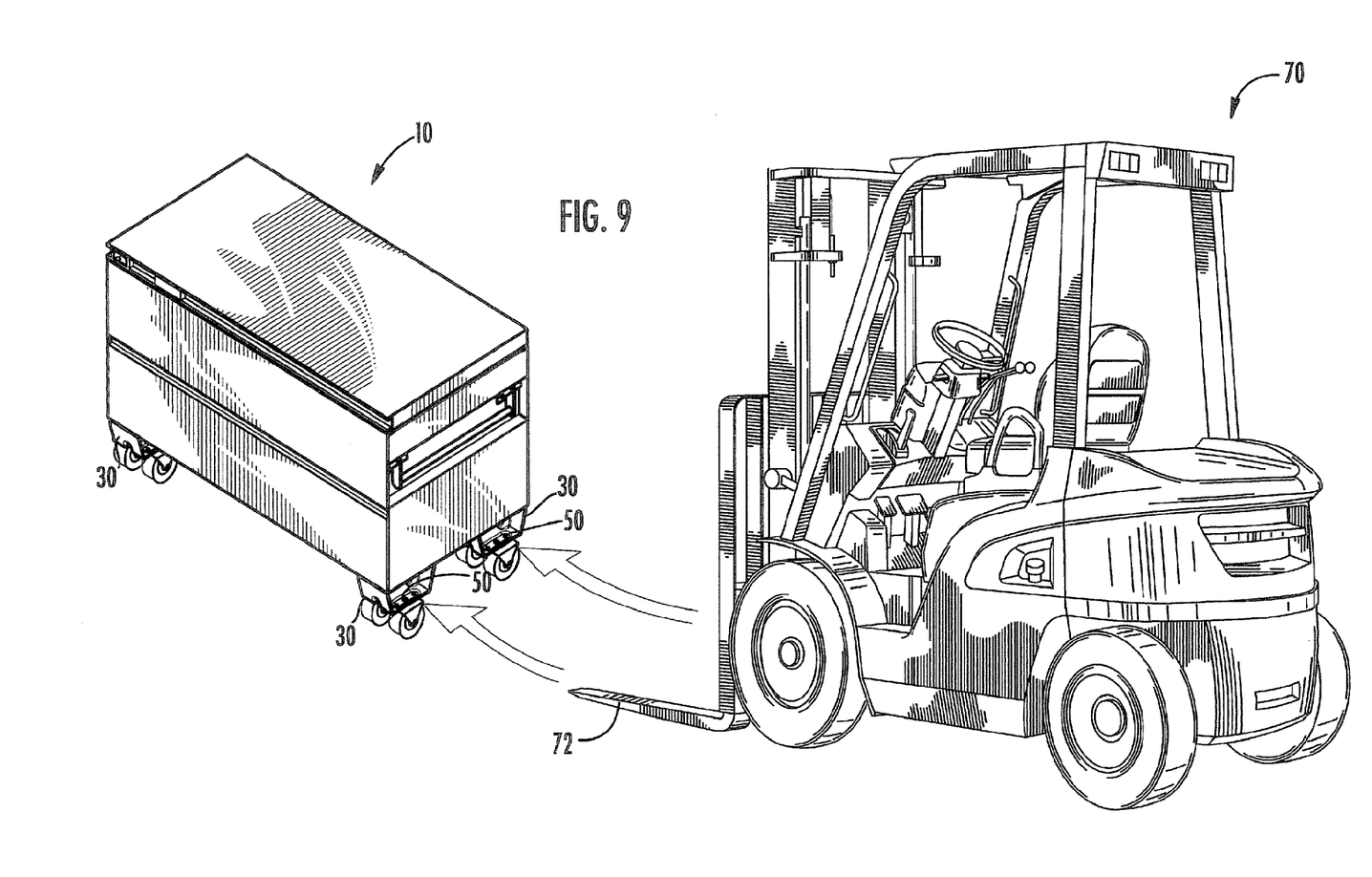
FIG. 9 is a perspective view of the container of FIGS. 1-3 being lifted by a forklift from the side of the container.

As shown in FIGS. 8-9, the bolsters 30 provide entry windows 50, 60 that are substantially perpendicular to one another such that the container 10 may be lifted by a forklift 70 from the sides or from the front or back of the container 10. The entry windows 50, 60 form openings that are accessible from a side of the container 10 (i.e., via window 50) and from a front of the container 60 (i.e., via window 60). As illustrated, prongs 72 of the forklift 70 may be inserted in respective entry windows 60 to lift the container 10 from the front (FIG. 8) or the prongs 72 of the forklift 70 may be inserted in respective entry windows 50 to lift the container from the side (FIG. 9).

Figure 10:
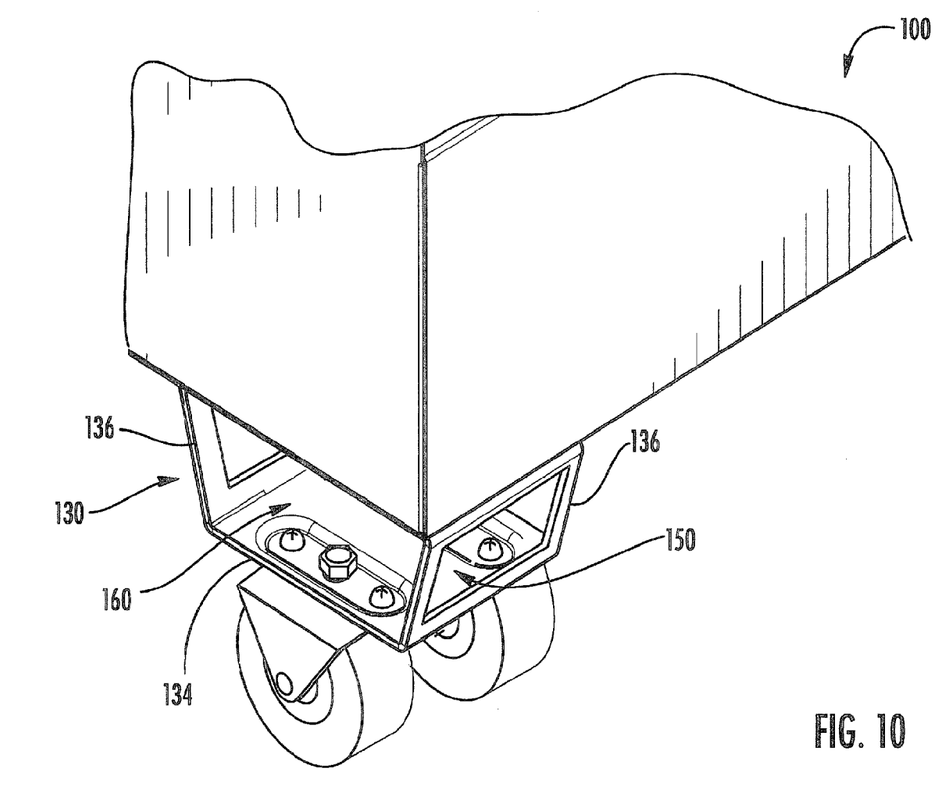
FIG. 10 is a partial top perspective view of the container and a bolster according to further embodiments of the present invention.

Those skilled in this art will recognize that the container 10 may take other configurations. For example, various sizes, shapes and configurations can be used to form the bolsters 30 and entry windows 50, 60. In particular, as shown in FIG. 10, a container 100 includes a bolster 130 having entry windows 150, 160. As illustrated in FIG. 10, the bolster 130 includes walls 136 that extend downwardly from the container 100 and a lower panel 134. The walls 136 have an opening that forms the entry window 150. The walls 136 and the panel 134 together form the entry window 160. In this configuration, the entry windows 150, 160 are accessible from a side and a front of the container.

Figure 11:
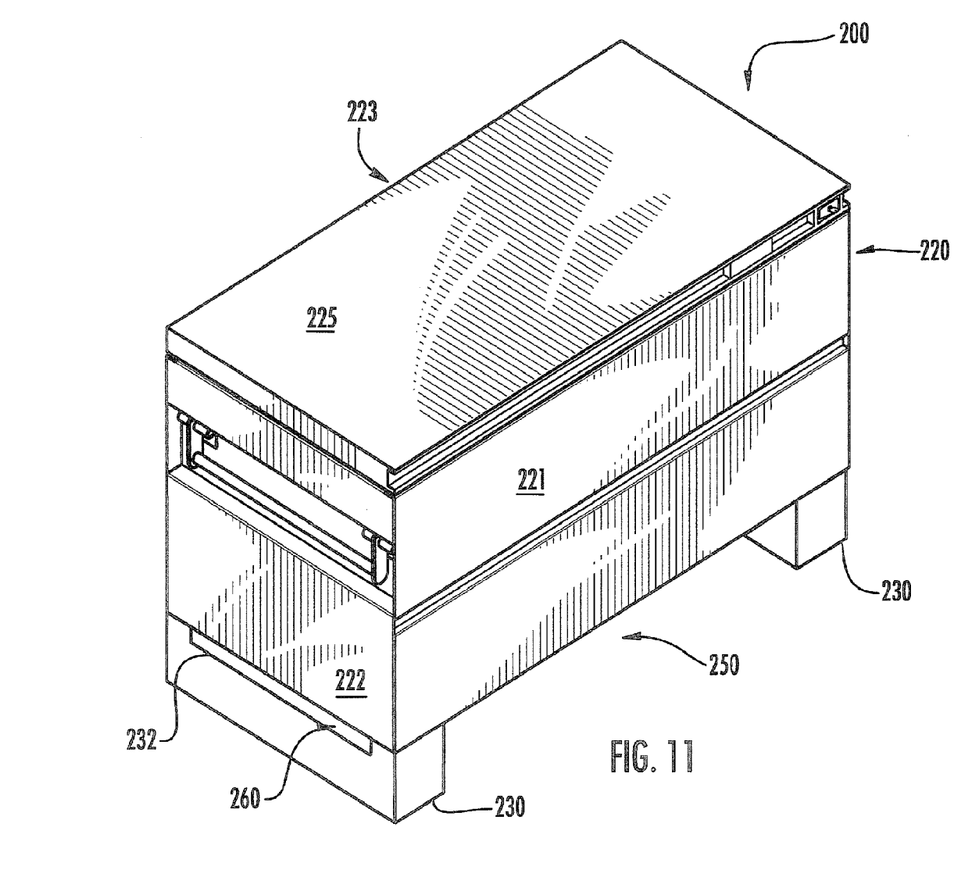
FIG. 11 is a top perspective view of a container and bolsters according to still further embodiments of the present invention.

As illustrated in FIG. 11, a container 200 includes bolsters 230 extending along a side 222 of a receptacle 220. The receptacle 220 has a front wall 221, opposing sidewalls 222 that are perpendicular to the front wall 221, a rear wall 223 that opposes the front wall 221, a floor 24, and a cover 235 that is attached via a hinge to the rear wall 223. The bolsters 230 define an entry window 250 adjacent the front wall 221. The bolsters 230 also include a notch 232 adjacent the side walls 222, which defines another entry window 260. In this configuration, the prongs from a forklift may be inserted from the front of the container 200 via the entry window 250 or from the side of the container 200 via the entry window 260.

As shown in FIGS. 4-7, the bolster 30 is formed as a unitary member. In particular, the dual bolster assembly 31 may be formed from a unitary member such as a single sheet of metal and connected by the upper panel 42. The sheet of metal may have a thickness between 0.0299 and 0.5 inches. The bolsters 30 may be attached to the floor 24 by the panel 42 and the upper portion of the walls 36, for example, by welding. In some embodiments, the upper panel 42 is omitted, and the bolsters 30 are formed separately from one another.

The bolsters 30 include creases 38a, 38b, which may increase the strength and/or rigidity of the bolster 30. The lower crease 38b may also guide the prong 72 of the forklift 70 into the entry windows 60 as shown in FIG. 8. In some embodiments, the creases 38a, 38b are omitted.

Figure 6:
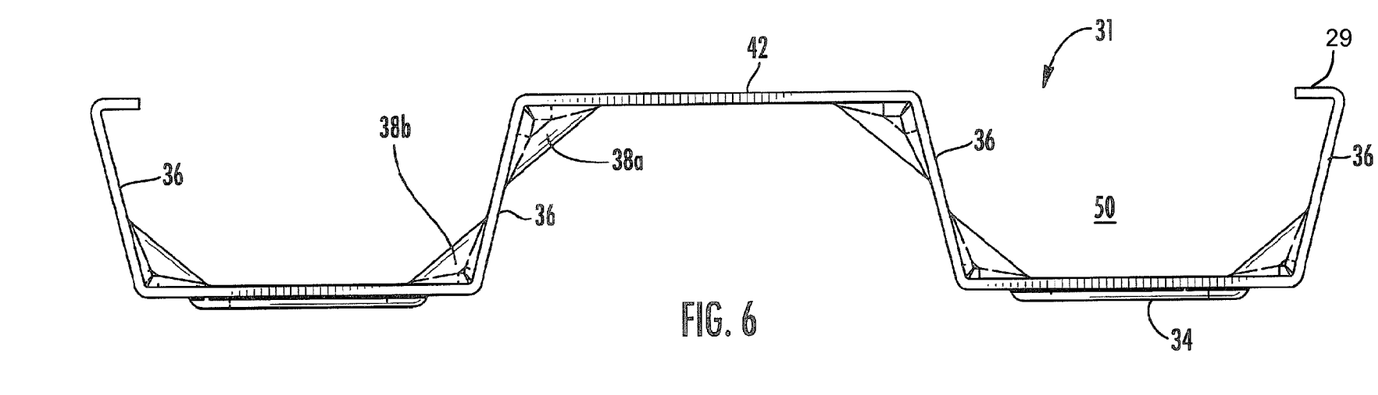
FIG. 6 is a front view of the bolsters of FIGS. 1-5.
Figure 7:
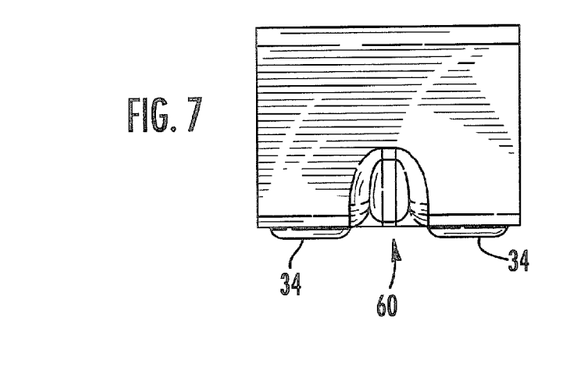
FIG. 7 is a side view of the bolsters of FIGS. 1-6.

As shown in FIGS. 3 and 6, the bolster walls 36 extend at an angle with respect to the upper panel 42, the lower panel 32 and the container floor 24 such that the bolster walls 36 are not perpendicular to the container floor 24. As illustrated, the angle at which the walls 36 extend with respect to the container floor 24 and the panels 32, 42 may strengthen the structure of the bolsters 341 for bearing weight from the container 10; however, in some embodiments, the bolster walls 36 may be perpendicular to the container floor 24 and the panels 32, 42.

As illustrated in FIGS. 1-7, the projections 34 of the bolsters 30 include apertures 40, which may be used to hold casters 48 therein as shown in FIG. 2. Pairs of the projections 34 on the bolsters 30 define the entry window 50 such that, when the container 10 is positioned on a flat surface, such as the ground or floor, the entry window 50 provides sufficient space for the prongs 72 of the forklift 70 so that the forklift 70 can lift the container 10 from the front (FIG. 2 and FIG. 8). In some embodiments, the projections extend at least 0.25 inches from the lower panel 32. However, the apertures 40 and casters 48 may be omitted, and the bolsters 30 may rest directly on the ground or floor. If the casters 48 are omitted, the projections 34 may extend a greater distance from the lower panel 32 to provide sufficient space for the prongs 72 of the forklift 70, such as at least 0.25 inches from the lower panel 32.

As illustrated in FIG. 2, two casters 48 are affixed to each bolster 30 on respective projections 34 by screws 48a. The illustrated two-caster configuration may provide stability and support to the container 10; however, one caster 48 per bolster 30 may be used, or more than two casters 48 may be used on a single bolster 30. The casters can have a height of between three and sixteen inches. The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A container adapted to be lifted by a forklift having a pair of prongs, comprising:

a receptacle having a floor, a front wall extending upwardly from a front edge of the floor, a rear wall extending upwardly from a rear edge of the floor, and a pair of opposed sidewalls extending upwardly from a pair of side edges of the floor, wherein the front edge, rear edge and side edges of the floor define a perimeter of the floor, wherein the front edge and the rear edge are parallel to each other, wherein the side edges are parallel to each other, and wherein each of the front edge and the rear edge is longer than each of the side edges; and a plurality of bolsters attached to an underside surface of the floor at respective corners defined by the front edge, side edges, and rear edge, each bolster comprising an upper panel attached to the underside surface of the floor, a lower panel spaced apart from the underside surface of the floor, and first and second rigid sidewalls, each extending from the lower panel to the floor and in a direction parallel to the front edge and the rear edge so that a first entry window is formed between the first and second sidewalls that is accessible from one of the side edges of the floor and is configured to slidably receive one of the prongs of the forklift under the floor within an area bounded by the perimeter of the floor, the first sidewall extending from the lower panel to the upper panel and curving to form the upper panel so that the lower panel, the first sidewall, and the upper panel are formed from a single sheet-like member and so that an acute angle is defined between the first sidewall and the upper panel;

an upper center panel attached to the underside surface of the floor and connecting respective second sidewalls of a first pair of the bolsters that are attached to the underside surface at corners defined by one side edge of the pair of side edges; and an upper center panel attached to the underside surface of the floor and connecting respective second sidewalls of a second pair of the bolsters that are attached to the underside surface at corners defined by the other side edge of the pair of side edges, wherein for a third pair of the bolsters that are attached to the underside surface at corners defined by the front edge, the bolsters of the third pair are not directly connected and are spaced from each other so that a continuous space is defined below the underside surface and adjacent each bolster of the third pair, wherein each respective space is between the bolsters of the third pair, extends to the front edge, extends, with respect to the bolster adjacent the space, to the said sidewall that is further from the front edge and to the lower panel, and is open in opposing directions parallel to the floor and perpendicular to the front edge and in a direction perpendicular to and away from the floor, and wherein, for a fourth pair of the bolsters that are attached to the underside surface at corners defined by the rear edge, the bolsters of the fourth pair are not directly connected and are spaced from each other so that a continuous space is defined below the underside surface and adjacent each bolster of the fourth pair, wherein each respective space is between the bolsters of the fourth pair, extends to the rear edge, extends, with respect to the bolster adjacent the space, to the said sidewall that is further from the rear edge and to the lower panel, and is open in opposing directions parallel to the floor and perpendicular to the rear edge and in a direction perpendicular to and away from the floor.

2. The container of claim 1, wherein the floor of the receptacle is rectangular.

3. The container of claim 1, wherein each of the first pair of bolsters and second pair of bolsters is formed from a respective single unitary member.

4. The container of claim 1, wherein each sidewall of each bolster defines an aperture forming a second entry window configured to slidably receive one of the prongs of the forklift.

5. The container of claim 1, wherein the underside surface of the floor is generally planar, and wherein the first and second sidewalls of each bolster extend from the lower panel toward the floor of the container at an oblique angle with respect to the lower panel.

6. A container adapted to be lifted by a forklift having a pair of prongs, comprising:

a receptacle having a floor, a rear wall extending upwardly from the floor, and a pair of opposed sidewalls extending upwardly from the floor, wherein a bottom perimeter of the container encloses an underside surface of the floor and has a rear edge parallel to the rear wall, a pair of side edges parallel to each other and the opposed sidewalls, and a front edge parallel to the rear edge, wherein each of the front and rear edges of the perimeter is longer than each of the side edges; and a plurality of bolsters attached to the underside surface of the floor and at respective corners defined by the front edge, side edges, and rear edge of the perimeter, each bolster comprising an upper panel attached to the underside surface of the floor, a lower panel spaced apart from the underside surface of the floor, and first and second rigid sidewalls, each extending from the lower panel to the floor and in a direction parallel to the front edge and the rear edge so that a first entry window is formed between the first and second sidewalls that is accessible from one of the side edges and is configured to slidably receive one of the prongs of the forklift under the floor within an area bounded by the perimeter, the first sidewall extending from the lower panel to the upper panel and curving to form the upper panel so that the lower panel, the first sidewall, and the upper panel are formed from a single sheet-like member and so that an acute angel is defined between the first sidewall and the upper panel;

an upper center panel attached to the underside surface of the floor and connecting respective second sidewalls of a first pair of the bolsters that are attached to the underside surface at corners defined by one side edge of the pair of side edges; and an upper center panel attached to the underside surface of the floor and connecting respective second sidewalls of a second pair of the bolsters that are attached to the underside surface at corners defined by the other side edge of the pair of side edges, wherein for a third pair of the bolsters that are attached to the underside surface at corners defined by the front edge, the bolsters of the third pair are not directly connected and are spaced from each other so that a continuous space is defined below the underside surface and adjacent each bolster of the third pair, wherein each respective space is between the bolsters of the third pair, extends, with respect to the bolster adjacent the space, to the said sidewall thereof that is further from the front edge and to the lower panel, and is open in opposing directions parallel to the floor and perpendicular to the front edge and in a direction perpendicular and away from the floor, and wherein, for a fourth pair of the bolsters that are attached to the underside surface at corners defined by the rear edge, the bolsters of the fourth pair are not directly connected and are spaced from each other so that a continuous space is defined below the underside surface and adjacent each bolster of the fourth pair, wherein each respective space is between the bolsters of the fourth pair, extends to the rear edge, extends, with respect to the bolster adjacent the space, to the said sidewall thereof that is further from the rear edge and to the lower panel, and is open in opposing directions parallel to the floor and perpendicular to the rear edge and in a direction perpendicular to and away from the floor.

7. The container of claim 6, wherein each of the first pair of bolsters and the second pair of bolsters is formed as a respective single unitary member.

8. The container of claim 6, wherein each sidewall of each bolster defines an aperture forming a second entry window configured to slidably receive one of the prongs of the forklift.

9. The container of claim 6, wherein the underside surface of the floor is generally planar, and wherein the sidewalls of each bolster extend from the lower panel to the floor of the container at an oblique angle with respect to the lower panel.

10. A container adapted to be lifted by a forklift having a pair of prongs, comprising:

a receptacle having a floor, a rear wall extending upwardly from the floor, and a pair of opposed sidewalls extending upwardly from the floor, wherein a bottom perimeter of the container encloses an underside surface of the floor and has a rear edge parallel to the rear wall, a pair of side edges parallel to each other and the opposed sidewalls, and a front edge parallel to the rear edge, wherein each of the front and rear edges of the perimeter is longer than each of the side edges;

a plurality of bolsters attached to the underside surface of the floor at respective corners defined by the front edge, side edges, and rear edge of the perimeter, each bolster comprising an upper panel attached to the underside surface of the floor, a lower panel spaced apart from the underside surface of the floor, and first and second rigid sidewalls, each extending from the lower panel to the floor and in a direction parallel to the front edge and the rear edge so that a first entry window is formed between the first and second sidewalls that is accessible from one of the side edges and is configured to slidably receive one of the prongs of the forklift under the floor within an area bounded by the perimeter, the first sidewall extending from the lower panel to the upper panel and curving to form the upper panel so that the lower panel, the first sidewall, and the upper panel are formed from a single sheet-like member and so that an acute angle is defined between the first sidewall and the upper panel;

an upper center panel attached to the underside surface of the floor and connecting respective second sidewalls of a first pair of the bolsters that are attached to the underside surface at corners defined by one side edge of the pair of side edges; and an upper center panel attached to the underside surface of the floor and connecting respective second sidewalls of a second pair of the bolsters that are attached to the underside surface at corners defined by the other side edge of the pair of side edges, wherein for a third pair of the bolsters that are attached to the underside surface at corners defined by the front edge, the bolsters of the third pair are not directly connected and are spaced from each other so that a continuous space is defined below the underside surface and adjacent each bolster of the third pair, wherein each respective space is between the bolsters of the third pair, extends to the front edge, extends, with respect to the bolster adjacent the space, to the said sidewall that is further from the front edge and to the lower panel, and is open in opposing directions parallel to the floor and perpendicular to the front edge and in a direction perpendicular to and away from the floor, and wherein, for a fourth pair of the bolsters that are attached to the underside surface at corners defined by the rear edge, the bolsters of the fourth pair are not directly connected and are spaced from each other so that a continuous space is defined below the underside surface and adjacent each bolster of the fourth pair, wherein each respective space is between the bolsters of the fourth pair, extends to the rear edge, extends, with respect to the bolster adjacent the space, to the said sidewall that is further from the rear edge and to the lower panel, and is open in opposing directions parallel to the floor and perpendicular to the rear edge and in a direction perpendicular to and away from the floor.

11. The container of claim 10, wherein each of the first pair of bolsters and the second pair of bolsters is formed as a respective single unitary member.

12. The container of claim 10, wherein each sidewall of each bolster defines an aperture forming a second entry window configured to slidably receive one of the prongs of the forklift.

13. The container of claim 10, wherein the underside surface of the floor is generally planar, and wherein the sidewalls of each bolster extend from the lower panel to the floor of the container at an oblique angle with respect to the lower panel.

* * * * *